(12) United States Patent
Sergeeva et al.

(10) Patent No.: US 11,030,596 B1
(45) Date of Patent: Jun. 8, 2021

(54) SYSTEM FOR DATA TRANSFER BETWEEN SERVER, REMOTE VENDING MACHINE AND COMPUTING DEVICE OF THE USER

(71) Applicants: Nina P Sergeeva, St. Petersburg (RU); Kirill Sizyumov, Reutov (RU); Ruslan Ruziev, Moscow (RU); Nikita Makarov, Moscow (RU); Ivan Gurkin, Vidnoye (RU)

(72) Inventors: Nina P Sergeeva, St. Petersburg (RU); Kirill Sizyumov, Reutov (RU); Ruslan Ruziev, Moscow (RU); Nikita Makarov, Moscow (RU); Ivan Gurkin, Vidnoye (RU)

(73) Assignee: MHG IP Holdings LLC, Bloomfield Hills, MI (US)

( * ) Notice: Subject to any disclaimer, the term of this patent is extended or adjusted under 35 U.S.C. 154(b) by 0 days.

(21) Appl. No.: 17/039,506

(22) Filed: Sep. 30, 2020

(51) Int. Cl.
| | | |
|---|---|---|
| *G06Q 20/18* | (2012.01) | |
| *G06Q 20/02* | (2012.01) | |
| *G06K 7/10* | (2006.01) | |
| *G06Q 20/20* | (2012.01) | |
| *G06Q 10/08* | (2012.01) | |
| *G06Q 30/06* | (2012.01) | |
| *G06K 19/07* | (2006.01) | |
| *G05B 19/042* | (2006.01) | |
| *G07F 17/00* | (2006.01) | |

(Continued)

(52) U.S. Cl.
CPC ........... *G06Q 20/18* (2013.01); *G05B 19/042* (2013.01); *G06K 7/10297* (2013.01); *G06K 7/10415* (2013.01); *G06K 19/0723* (2013.01); *G06Q 10/04* (2013.01); *G06Q 10/087* (2013.01); *G06Q 20/02* (2013.01); *G06Q 20/203* (2013.01); *G06Q 30/0623* (2013.01); *G07F 17/0014* (2013.01); *G05B 2219/2645* (2013.01); *G06K 2007/10504* (2013.01); *G06Q 20/326* (2020.05)

(58) Field of Classification Search
CPC .... G06Q 20/18; G06Q 20/203; G06Q 20/326; G06K 7/10297
See application file for complete search history.

(56) References Cited

U.S. PATENT DOCUMENTS

| | | | | |
|---|---|---|---|---|
| 2003/0174099 A1* | 9/2003 | Bauer | ................... | G06K 7/0008 343/893 |
| 2007/0069018 A1* | 3/2007 | Dearing | ............. | G06K 7/10336 235/385 |

(Continued)

*Primary Examiner* — A. Hunter Wilder
(74) *Attorney, Agent, or Firm* — Inventa Capital PLC

(57) ABSTRACT

A system for data transfer between a server, a remote vending machine and a user computing device includes a remote vending machine for selectively providing an item stored therein to a user, a user computing device, an accounting server, a transaction server, and a data transfer network, wherein the vending machine comprises a door, a radio-frequency identification (RFID) antenna, a communication module, a memory, and a controller. The controller is communicatively coupled by a data transfer bus with the memory, the communication module and the RFID antenna. The user computing device comprises an authorization module and is configured to transfer to and receive data from the accounting server. The accounting and transaction servers, the vending machine and the user computing device are communicatively interconnected with one another by the data transfer network.

20 Claims, 3 Drawing Sheets

(51) Int. Cl.
*G06Q 10/04* (2012.01)
*G06Q 20/32* (2012.01)

(56) References Cited

U.S. PATENT DOCUMENTS

| | | | | |
|---|---|---|---|---|
| 2011/0173082 | A1* | 7/2011 | Breitenbach | G06Q 30/0601 |
| | | | | 705/16 |
| 2012/0029691 | A1* | 2/2012 | Mockus | G06Q 20/3224 |
| | | | | 700/232 |
| 2014/0316916 | A1* | 10/2014 | Hay | A47F 9/048 |
| | | | | 705/17 |
| 2020/0273011 | A1* | 8/2020 | Winsor | G06Q 30/0255 |

* cited by examiner

SYSTEM FOR DATA TRANSFER BETWEEN SERVER, REMOTE VENDING MACHINE AND COMPUTING DEVICE OF THE USER

FIELD OF THE INVENTION

The present invention relates to a computer equipment for data transfer between various of computing devices, and more particularly, the present invention relates to a vending machine system providing one or more items stored therein to be purchased by a user.

BRIEF DESCRIPTION OF THE INVENTION

Currently, there are many computer systems for vending machines. One of the examples of such systems is a vending apparatus control system using the RFID technology. This solution envisages the vending machine, connected to the remote station, which delivers the marked container to the user from the storage area, where containers of the various sizes and forms with different products, such as medical products, are stored.

The control system is able to select a specific unlabeled container from other containers in the storage and move the selected unlabeled container to the labelling module, where the label is applied after the position of the label and/or the selected unlabeled container is set in such manner that the label is applied in the desired position and angular orientation in relation to the selected unlabeled container. The control system of the vending machine can also move the labeled container to a delivery zone available to the user.

However, the known prior art solution has some drawbacks. The drawbacks of the known solution include the low accuracy of registration of the product withdrawal from the internal space of the vending machine.

The present invention aims to solve this problem by simple and convenient means and to eliminate the above-mentioned drawbacks.

SUMMARY OF THE INVENTION

A system for data transfer between a server, a remote vending machine and a user computing device includes a remote vending machine for selectively providing an item stored therein to a user, a user computing device, an accounting server, a transaction server, and a data transfer network. The vending machine includes a door, a radio-frequency identification (RFID) antenna, a communication module, a memory, and a controller. The controller is communicatively coupled by a data transfer bus with the memory, the communication module and the RFID antenna. The user computing device includes an authorization module and is configured to transfer to and receive data from the accounting server.

The accounting server is connected to an operator display and configured to communicate, via the data transfer network, with the user computing device, remote vending machine and transaction server, the accounting server includes an artificial intelligence (AI) module and is configured to perform accounting and transactions for the item in the remote vending machine. The transaction server includes a database and configured to facilitate a transaction between the accounting server and the user computing device. The accounting and transaction servers, the vending machine and the user computing device are communicatively interconnected with one another by the data transfer network.

The accounting server is configured to perform a transaction with the transaction server in response to data received from the remote vending machine after the door of the remote vending machine is closed. The AI module is configured to automatically analyze inventory data of the item stored in the remote vending machine and transmit the inventory data to the operator display. The inventory data includes a forecast of future inventories of the item in the remote vending machine based on information received from the remote vending machine and an expiration date of the item in the remote vending machine.

The accounting server is configured, in response to data received from the remote vending machine, to transmit the data to the transaction server. The transaction server is configured to perform the transaction between the accounting server and the user computing device based on the data. The remote vending machine is configured to communicate, via the communication module and data transfer network, with the accounting server and user computing device.

The authorization module is configured to provide an authorization or authentication of a user, wherein if the authorization fails the authorization module is configured to prompt a display of the user computing device to display an error, and if the authorization succeeds the authorization module is configured to transmit a command to the controller of the remote vending machine to initiate the controller to open or unlock the door of the remote vending machine, receive data from the controller of the remote vending machine after the door of the remote vending machine closes or locks; and prompt a transaction to be made between the accounting server and transaction server based on the data from the controller of the remote vending machine.

The authorization module is configured to initiate the display of the user computing device to display information about the item and a price of the item. The remote vending machine further includes a temperature gauge and a humidity gauge, wherein the controller of the vending machine is configured to receive data transmitted by the RFID antenna and the temperature and humidity gauges of the remote vending machine. The controller is configured to register the data and, in response to a deviation from humidity or temperature set limit, the controller is configured to prompt a respective humidity or temperature adjustment unit of the remote vending machine to regulate respective humidity or temperature inside a chamber of the remote vending machine.

The remote vending machine further comprises an interface display configured to provide video content, and wherein the interface display is controlled by the controller of the remote vending machine. The item includes a passive RFID tag attached thereto, wherein the RFID antenna is configured to detect presence or absence of the passive RFID tag of the item inside the remote vending machine. The RFID antenna is configured to communicate information on whether the passive RFID tag is present or absent to the controller, the controller is configured to transmit the information, via the communication module, to the accounting server.

The RFID antenna is configured to radiate an electromagnetic intensity field, wherein the passive RFID tag is configured, in response to the electromagnetic intensity field, to modulate a high-frequency field, wherein the RFID antenna is configured, in response to the high-frequency field, to switch to a reading mode to receive and transmit vibrations of the high-frequency field of the passive RFID tag to the controller. The vibrations transmitted by the RFID antenna to the controller are received after the door of the remote vending machine is locked or closed. The controller of the remote vending machine is configured, in response to the door of the remote vending machine locking or closing, to prompt the RFID antenna to receive the information on whether the passive RFID tag is present or absent, and wherein the RFID antenna is configured, in response to the passive RFID tag being absent, to transmit data related to the passive RFID tag being absent to the controller. The controller is configured, in response to receiving the data related to the passive RFID tag being absent, to perform a comparison of the data with data stored in the memory of the remote vending machine.

The comparison includes a determination that the data was or was not detected and transmitted to the accounting server when the door was last opened or unlocked, and wherein the controller is configured, in response to the determination that the data was not detected and transmitted, to store the data in the memory for subsequent comparisons and transmit the data to the accounting server. The accounting server is configured to store the data in a database that contains information related to inventory of the remote vending machine, and wherein the AI module performs an automatic analysis of the information and transmits the analysis to the operator display.

The system accounting server is configured to communicate with the transaction server and transmit a request for a transaction based on the data related to the passive RFID tag being absent, and wherein the transaction server is configured to receive the request and process the transaction between the user computing device and accounting server. The technical result is elimination of errors when the vending machine gives products to the user, at the same time increasing the automation and accuracy of data transmitted between the server, the user's computing device, a remote transaction server and the vending machine using RFID antennas in the vending machine.

An advantage of the present invention is to provide the inventive system (the system) for data transfer between the server, the remote vending machine and the user computing device wherein the system includes a server for the accounting of cash balances and transactions connected to the operator's display, and providing the possibility of communication via the data transfer network with at least one remote vending machine, at least one user's computing device, and at least one remote transaction server with at least one database, containing data about the inventory of a remote vending machine.

Another advantage of the present invention is to provide the inventive system wherein the inventory accounting server includes an AI unit, providing the possibility of automatic analysis of data about the inventory to be shown on the operator's display, where the data analysis shall mean the forecast of the future inventories in the remote vending machine taking into account the data, received from the remote vending machine, at the same time the accounting server provides the possibility of making transactions with the remote transaction server in response to the data, received from at least one remote vending machine after the door of the vending machine was closed;

Still another advantage of the present invention is to provide the inventive system wherein the remote vending machine provides the possibility of communication via the data transfer network and the communication device with the accounting server and provides the possibility of giving the product to the users, at the same time the remote vending machine contains: controller providing the possibility to read data from RFID antennas and containing sockets for connection of the vending machine lighting, vending machine locks, vending machine temperature and humidity gauges, and a power socket for power supply from the uninterruptable power supply and power supply network.

Still another advantage of the present invention is to provide the inventive system wherein the sockets provide the control of lighting and locks of the vending machine, temperature and humidity inside the vending machine, while the data is read from the RFID antennas when the vending machine door is closed.

Still another advantage of the present invention is to provide the inventive system including the memory, connected to the controller, which provides the possibility to save the data read from RFID antennas and received from the data accounting server; and a communication device providing the possibility to transfer the data read from RFID antennas to the accounting server and to receive the data processed by the mentioned server.

Still another advantage of the present invention is to provide the inventive system including the RFID antennas providing the possibility to determine the existence or absence of the passive RFID tags of each product, placed in the remote vending machine and designated to be issued to the user and ensuring transfer of data to and from the controller, where the data present information about the product moved from the internal space, remote vending machine after the door of the vending machine is closed.

Still another advantage of the present invention is to provide the inventive system including the user's computing device providing the possibility to receive and transfer data from the accounting server, at the same time the user's computing device contains the authorization module providing the possibility of user authorization; at the same time in case of the failed authorization of the user, the authorization module displays an error message on the user's computing device screen.

Still another advantage of the present invention is to provide the inventive system wherein in case of successful authorization performs the following: transfer of commands to the vending machine controller using the data transfer network and the accounting server, where the commands initiate the controller to open the lock of the vending machine door; reception of data from the vending machine controller via the data transfer network and accounting server after the vending machine door is closed; and provides for the transaction to be made between the accounting server and the remote transaction server according to the data, received from the vending machine controller.

Still another advantage of the present invention is to provide the inventive system including the additional AI unit adaptable to send to the operators display the information about expiration date of the product, placed in the vending machine.

Still another advantage of the present invention is to provide the inventive system wherein the vending machine includes the display, controlled by the controller and providing the possibility of video content output, wherein the data transfer network is a TCP/IP network and/or WiFi network and the controller contains a discrete SIM-card used to connect to the data transfer network, which is a part of the mobile Internet network.

The objects and advantages of the present invention will be more readily apparent from inspection of the following specification, taken in connection with the accompanying drawing, wherein like numerals refer to like parts throughout and in which an embodiment of the present invention is described and illustrated.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
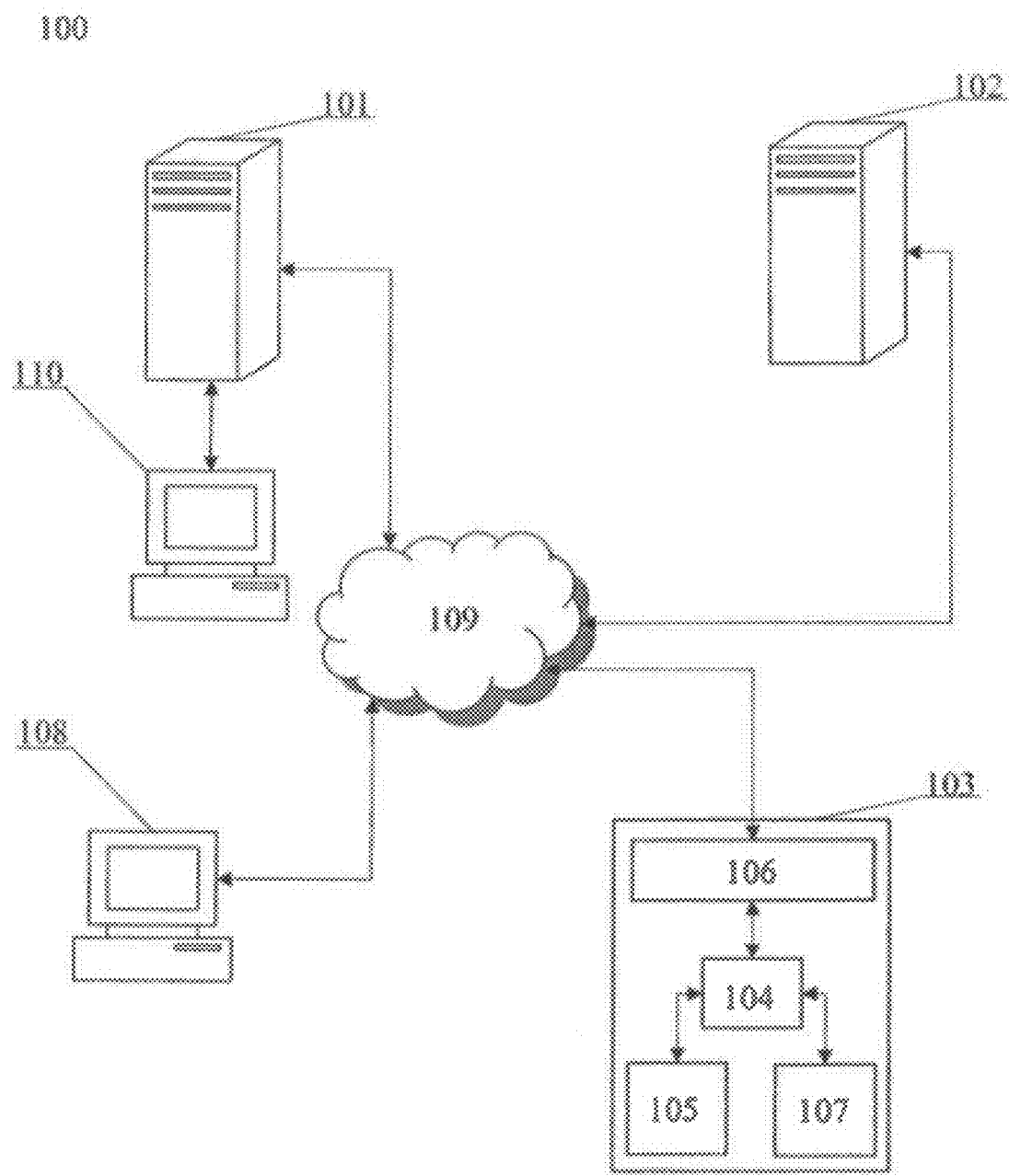
FIG. 1 is a schematic illustration of a data transfer system between a server, a remote vending machine and a user's computing device.
Figure 2:
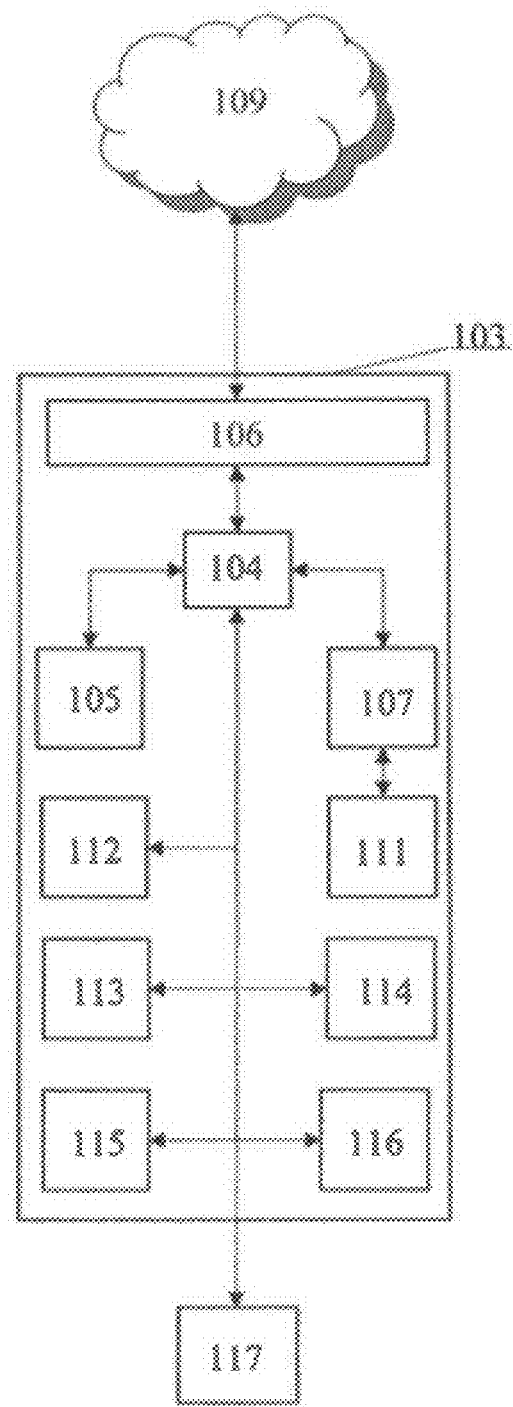
FIG. 2 is a schematic illustration of the vending machine configured to establish a two-way communication with a remote server, reading data from RFID antennas and providing product to the users.
Figure 3:
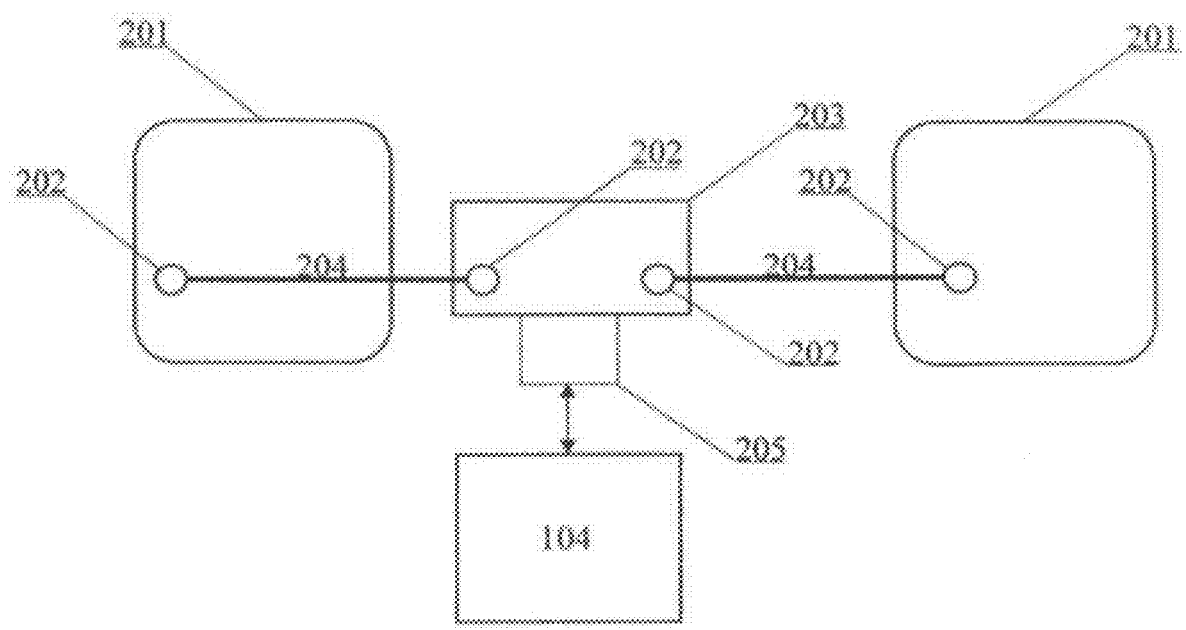
FIG. 3 is a schematic illustration of an RFID vending machine RFID antenna.

Referring to the FIGS. 1 through 3, a vending machine system (the system) is generally shown at 100 in FIG. 1. Because explicit identification of object-oriented constructs expressed through the syntax of high-level object-oriented programming languages is lost during compilation to binary code (e.g., translation of a source code definition or representation of an application to a binary code definition or representation of the application such as a machine code or byte-code definition), potential security vulnerabilities can be obscured during static analysis of the resulting binary code.

For example, because information about an object (e.g., the class on which the object is based, the size of the object, the number and types or sizes of properties of the object, and the number of functionalities accessible to the object via a dispatch table) is typically not expressed in binary code, determining whether indirect operations relative to the object expose security vulnerabilities can be difficult without the source code from which the binary code was generated.

As a specific example, an indirect operation can result in arbitrary code execution security vulnerabilities if the binary code does not include run-time validation to ensure that the indirect operation does not operate outside or beyond the object (i.e., at memory addresses not allocated to or shared by the object). Some binary code representations of applications, however, do include information about objects. Such information can be included in binary code as run-time type information (RTTI) or debugging information that is compiled into the binary code. Nevertheless, because the binary code representations of many applications do not include such information (e.g., to discourage reverse engineering of these applications), robust methodologies and systems for analyzing binary code based on (or derived from) source code using object-oriented techniques should not assume availability of such information.

Implementations discussed herein analyze operations described in binary code to identify objects based on those operations. Said differently, implementations discussed herein reconstruct, at least partially, objects (or representations of objects) by inferring the structure of such objects based on operations described in binary code. Thus, implementations discussed herein can identify objects and attributes such as a size thereof without referring to (or independent of) source code or explicit information about such objects which may or may not be included in the binary code.

Furthermore, implementations discussed herein perform security vulnerability analyses of binary code representations of applications using such objects. For example, implementations discussed herein can identify security vulnerabilities such as type confusion vulnerabilities that can result in arbitrary code execution, code injection, application failure, or other undesirable or unintended behavior of an application using information about objects identified by analysis of operations described in binary code.

Accordingly, implementations discussed herein with reference to analysis of operations described in binary code should be understood to refer to analysis of those operations using a binary code representation of a software module or a representation of the software module derived from the binary code representation.

A variable within a memory is a memory location at which one or more values can be stored. Such a memory location can be at a processor memory (e.g., a register or cache), at a system memory (e.g., a Random Access Memory (RAM) of a computing system), or at some other memory. Operations within binary code that operate on such variables can refer to a memory address (either absolute or relative to another memory address such as an offset from a stack pointer) of that memory location. Thus, the identifier (e.g., memory address) of an object can be stored as a value at a memory location with a memory address that is used by operations within the binary code.

Accordingly, as used herein, terms such as "identifier of an object" and "memory address of an object" should be understood to refer to the identifier (e.g., memory address) itself or to a variable at which a value representing the identifier is stored. As used herein, the term "module" refers to a combination of hardware (e.g., a processor such as an integrated circuit or other circuitry) and software (e.g., machine- or processor-executable instructions, commands, or code such as firmware, programming, or object code).

A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Referring to FIG. 1, the system 100 for the data transfer between a server, a remote vending machine and a user's computing device. The system 100 consists of an accounting or inventory accounting server 101, a remote transaction server 102, a remote vending machine 103 and a user's computing device 108, where the server 101, the remote server 102, the remote vending machine 103 and the user's computing device 108 are communicatively connected between each other using data transfer network 109. The data transfer network 109 is one of the following networks: Internet, Wi-Fi, GPRS, 3G, 4G, 5G, WiMax, LTE or LTE-A based network, TCP/IP network. The inventory accounting and transactions server 101 is communicatively connected to the operator's screen or display 110 and provides the possibility of communication using the data transfer network 109 with at least one remote transaction server 102, at least one remote vending machine 103, and at least one user's computing device 108. The inventory accounting server 101 contains an AI unit for the automatic analysis of data relating to inventory for further display on the operator's screen 110. The data inventory analysis includes a forecast of future inventories in the remote vending machine 103, taking into account the data received from the remote vending machine 103. The accounting server 101 allows to make transactions with the remote transaction server 102 in response to the data received from at least one remote vending machine 103 after a door of the at least one vending machine 103 was closed.

Alluding to the above, the AI unit sends to the operator's display 110 information about expiration date(s) of the product; placed or stored in the vending machine 103. The remote transaction server 102 provides the possibility to ensure transaction between the user's computing device 108 and the accounting server 101. The remote server 102 is configured to operate as follows: in response to data received by the server 101 from the remote vending machine 103, the server 101 transmits the data on the transaction to the server 102. The server 102, in response to the received data, makes a transaction between the user's computing device 108 and the accounting server 101 in accordance with the received data. The remote vending machine 103 provides the possibility of communication, by using the data transfer network 109 and a communication device 106 included in the vending machine 103, with the accounting server 101. The vending machine 103 also provides the possibility of giving product to the user. The remote vending machine 103 includes a controller 104, a memory 105, the communication device 106 and a RFID antenna 107. The controller 104 is connected using the data transfer bus with the memory 105, the communication device 106 and the RFID antenna 107.

A more detailed description of the remote vending machine 103 construction will be given with reference to FIG. 2 to be described below.

The vending machine 103 is connected to the user's computing device 108 via the communication device 106. The user's computing device 108 provides the possibility for the transfer and receipt of data with the accounting server 101, at the same time the user's computing device 108 contains an authorization module, which provides the possibility of user authorization. In case of the failed authorization the user authorization module displays an error on the computing device 108 screen. In case of successful authorization it performs the following: transfer of commands to the vending machine 103 and the controller 104 using the data transfer network 109 and the accounting server 101, where the commands initiate the controller 104 to open the lock 113 of the vending machine door, reception of data from the vending machine 103 and the controller 104 via the data transfer network 109 and the accounting server 101 after the vending machine 103 door closes, and provides for the transaction to be made between the accounting server 101 and the remote transaction server 102 according to the data, received from the vending machine 103 and the controller 104.

The user's computing device 108 can be at least one of the following: tablet, smartphone, laptop, PC, and any other computing device, containing at least one processor and memory. Besides, the authorization module can provide the possibility to display on the user's computing device 108 screen the information about the composition of the product, its price and information about the fiscal receipt according to the product, the RFID antenna 107 of which was triggered when the product was taken from the vending machine 103.

Referring to FIG. 2, the vending machine 103 is described. The controller 104 provides the possibility to read the data from RFID antennas 107 and includes connection sockets, using the data transfer bus, for the lighting modules 112 of the vending machine, locks 113 of the vending machine, temperature 114 and humidity 115 gauges of the vending machine, and power sockets for power supply from an uninterruptible power supply 116 and power supply network 117. The above sockets are used to provide control of lighting and locks of the vending machine 103, temperature and humidity inside the vending machine 103. Besides, the controller 104 can contain a discrete SIM-card used to connect to the data transfer network, which is a part of the mobile Internet network.

Alluding to the above, the lighting modules 112 of the vending machine 103 illuminate the internal space of the vending machine 103, and also, if necessary, the external space near the vending machine 103. The locks 113 of the vending machine lock and unlock the door of the vending machine 103. At the same time the mentioned locking or unlocking are carried out in response to control signals from the controller 104. The temperature 114 and humidity 115 gauges ensure detection of the current temperature and humidity of the internal space.

The controller 104 registers the data received from the above gauges and, in case of deviation of humidity or temperature from the set limits, uses the internal devices to regulate the humidity and the temperature in its internal space. The vending device 103 also contains the uninterruptible power supply 116, connected to the corresponding input of the controller 104. The controller 104 is powered using the power supply network 117. However, in case of power interruption the network 117 automatically switches to the uninterruptible power supply 116. The vending machine can additionally include a display, controlled by the controller 104. The display provides the possibility to output video content.

Referring to FIG. 3, a structure of the RFID antennas 107 and the operation of RFID antennas 107 and the passive RFID tags 111 is described. The passive RFID tags 111 are attached to each separate product, located inside the vending machine 103. The RFID antennas 107 determine the presence or absence of the passive RFID tags 111 of each product, placed in the remote vending machine 103. The RFID antennas 107 also ensure reception and transfer of data to the controller 104 and the remote server 101 using the communication device 106. These data provide information about the product moved from the interior of the vending machine 103 after closing the door of the vending machine 103. Each RFID antenna 107 consists of two short-circuited emitters 201, connected between themselves with a divider 203 using cables 204 with low signal attenuation and feed points 202. The divider 203 is connected to the controller 104 of the vending machine 103 via a SMA socket 205.

Each RFID antenna 107 provides the electromagnetic intensity in the near range, where the mentioned intensity results in the possibility to detect the presence or absence of the passive RFID tags 111 near each RFID antenna 107. It should be noted that in this case, any other external device controller can be used as the controller 104 of the vending machine 103. PC, laptop, server, etc. can be used as an external device. The SMA socket 205 transmits the high frequency (860-920 MHz) current to the antenna divider 203 and subsequently the divider 203 transmits the current to the emitters 201. The antenna divider 203 and the emitters are two copper layers with thickness 35 nm, separated by a dielectric. When the current is applied, the potential difference between the copper layers generates electromagnetic radiation. Two short-circuited emitters 201 modulate a stable electromagnetic intensity within near range up to 20 cm along the entire length of the antenna (490 mm) and a predetermined radiation direction pattern, taking into account the displacement caused by the surrounding metal walls of the vending machine 103. Diagram of direction ±30 cm from the center lengthwise and ±20 cm from the center widthwise 20 cm away from the front side of the antenna reaching the gain of the antenna −1.25 dbi at SWR<1.04 is only possible if the antenna is surrounded by metal walls at the distance of 20 to 60 cm.

Due to the pattern of the upper copper layer 201 of the emitter, the circular polarization is achieved, due to which the electromagnetic waves are radiated along the helical arc, which allows to use any RFID tags 111 located within the RFID antenna 107 range. Within the electromagnetic intensity field radiated by the RFID antenna 107, the passive RFID tags 111 start to modulate the high-frequency field in response. At this point the RFID antenna 107 switches to reading mode and transmits all vibrations of the electromagnetic radiation from the tags 111 to the SMA connector 205 via the high frequency cable to the controller 104. The RFID antenna 107 itself is fixed horizontally and parallel to the shelves of the vending machine 103, where the products with passive RFID tags 111 are placed.

The data is read from the RFID antennas 107 when the door of the vending machine 103 is closed. Below we provide an example of the implementation of the solution. The user performs authorization (authentication) using the user's computing device 108 and an authorization module. If the authorization is failed, the authorization module displays an error message on the display of the device 108, and an offer to repeat the authorization process. In case of successful authorization, the authentication module sends a command to the controller 104 of the vending machine 103 via the data transfer network 109 and the accounting server 101, where the commands initiate the controller 104 to open the lock 113 of the vending machine 103 door. After the door opens, the user has the right to choose and take any product placed on the vending machine 103 shelves. When the product is selected and taken from the shelves of the vending machine, the door of the vending machine 103 closes. The fact of door closing is the moment when the controller 104 starts polling the RFID antennas 107.

Each RFID antenna 107 scans the passive RFID tags 111. If the scan by the mentioned RFID antenna (s) 107 discovers the absence of any of the RFID tags 111, a corresponding signal is transmitted by the RFID antenna 107 to the controller 104. The controller 104 receives the signal containing the data of the RFID tag 111 which has not been identified by the RFID antenna 107 after closing the vending machine 103 door. The controller 104 compares these data with the data stored in the memory 105. If in the result of the above-mentioned comparison, it is determined that the data were detected and transmitted to the server 101 at the previous door opening, the controller 104 stops further data processing. If in the result of the above mentioned comparison, it is determined that the data were not detected and transmitted to the server 101 at the previous door opening, the controller 104 stores this information in the memory 105 for subsequent comparisons, and at the same time transmits the data to the accounting server 101. In accordance with data transmitted by the controller 104, the accounting server 101 saves this information in at least one database, which contains data on the inventory of the remote vending machine 103. At the same time the AI unit of the server 101 performs an automatic analysis of the data on the inventory for further output to the operator's display 110. After saving, the server 101 connects to the transaction server 102, and upon establishing the connection sends a request for the transaction in accordance with the data received from the controller 104 of the vending machine 103. After receiving the mentioned request, the transaction server 102 makes a transaction between the user's computing device 108 and the accounting server 101 in accordance with the received data. Although this invention was shown and described with reference to some options in its implementation, the specialists in this sphere of technology will understand that various changes and modifications can be made in it, without leaving the actual scope of the invention.

In another aspect of the present invention the vending machine system (the system) 100 of the present invention is used to selectively providing one or more items stored therein to the user, the vending machine includes the radio-frequency identification (RFID) antenna 107, the communication module 106, the memory 105, and the controller, wherein the controller is communicatively coupled by the data transfer bus with the memory, the communication module 106 and the RFID antenna 107. The system 100 includes the user computing device 108, the accounting server 101 configured to perform inventory accounting for the one or more items in the vending machine.

The system 100 also includes the transaction server 102 configured to facilitate a transaction between the accounting server 101 and the user computing device 108, and a data transfer network, wherein the accounting and transaction servers 101, the vending machine and the user computing device 108 are communicatively interconnected with one another by the data transfer network. The accounting server 101 comprises an artificial intelligence (AI) module configured to conduct an automated inventory analysis of the vending machine, and wherein the accounting server 101 is communicatively coupled with a display for displaying the inventory analysis. The inventory analysis includes a forecast of future inventories required for the vending machine and an expiration date of the one or more items stored in the vending machine, and wherein the inventory analysis is based on data received from the vending machine. The accounting server 101 is configured to conduct a transaction with the transaction server 102 in response to transaction data received from the vending machine after one or more doors of the vending machine are locked. The transaction server 102 is configured, in response to transaction data received via the accounting server 101 from the vending machine, to conduct the transaction between the user computing device 108 and the accounting server 101 based on the transaction data.

The user computing device 108 comprises an authorization module configured to provide an authorization or authentication of the user, and wherein the user computing device 108 is configured to cause a transfer and receipt of data with the accounting server 101. In response to the user being authorized, the authorization module is configured to (a) transmit a command to the controller of the vending machine to initiate the controller to unlock the door of the vending machine, (b) receive data from the controller of the vending machine after the door of the vending machine is locked, and (c) initiate a transaction between the accounting server 101 and the transaction server 102 based on data received from the controller of the vending machine.

The authorization module is configured to prompt the screen of the user computing device 108 to display information about the one or more items provided by the vending machine. The vending machine further comprises the lighting module 112, one or more locking mechanisms 113, the temperature gauge 114 and the humidity gauge 115, and wherein the controller of the vending machine is communicatively connected with and configured to control the lighting module 112, the one or more locking mechanisms 113, the temperature gauge 114 and the humidity gauge 115. The lighting module 112 is configured to illuminate the internal chamber of the vending machine, wherein the one or more locking mechanisms 113 are configured to lock and unlock the door of the vending machine, and wherein the temperature 114 and humidity 115 gauges are configured to detect respective temperature and humidity of the internal chamber of the vending machine.

The vending machine further comprises a display 110 controlled by the controller of the vending machine, and wherein the display 110 is configured to output video content. Each of the one or more items stored in the vending machine comprises the passive RFID tag 111 attached thereto, and wherein the RFID antenna 107 of the vending machine is configured to determine presence or absence of the passive RFID tag 111 of each of the one or more items. The RFID antenna 107 is fixed horizontally and parallel to one or more shelves of the vending machine that support the one or more items with the passive RFID tag 111 attached thereto. The RFID antenna 107 is configured to communicate data related to the presence or absence of the one or more items in the vending machine to the controller, and wherein the controller is configured to transmit the data, via the communication module 106, to the accounting server 101.

The data related to the presence or absence of the one or more items in the vending machine is received by the controller from the RFID antenna 107 of the vending machine in response to a prompt sent by the controller when the door of the vending machine is locked. The RFID antenna 107 of the vending machine comprises the antenna divider 203, the pair of short-circuited emitters 201, the pair of cables 204 each connecting respective one of the short-circuited emitters 201 to the antenna divider 203, and the SMA connector 205 communicatively coupling the antenna divider 203 to the controller of the vending machine.

The memory of the vending machine is configured to record and store information about the one or more items stored in the vending machine, wherein the information is transmitted by the controller to the accounting server 101, and wherein the accounting server 101 stores the information in the database that contains inventory data of the vending machine.

The technical result in this case is the improved accuracy of registration of the product withdrawal from the internal space of the vending machine using the RFID antennas 107 and the passive RFID tags 111 in the vending machine. To reach this technical result the vending machine is offered, which provides the possibility to establish a two-way communication with the remote server 102, reading data from the RFID antennas 107 and providing products to the users. This machine includes the controller providing the possibility to read data from the RFID antennas 107 and containing the connectors for vending machine lighting modules, the vending machine locks 113, the vending machine temperature 114 and humidity 115 gauges, and the power socket to supply power from the uninterruptible power supply and power supply network, where the mentioned connectors are used to control the lighting and the locks 113 of the vending machine, temperature and humidity inside the vending machine, and at the same time the data is read from the RFID antennas 107 when the vending machine door closes; the memory 105, connected to the controller, to save the data read from the RFID antennas 107 and received from the data accounting server 101 and the communication device 106 to transfer data read from the RFID antennas 107, to the remote server 102 and reception of the data processed by the mentioned server; the RFID antennas 107 to determine the presence or absence of the passive RFID tags 111 of each product placed in the remote vending machine, and ensuring data transfer to and from the controller and the remote server 102 using the communication device 106, where the data present information about the product moved from the internal space of the vending machine after the vending machine door was closed, at the same time each RFID antenna 107 consists of two short-circuited emitters 201 with feed points, connected between themselves with a divider using cables with low signal attenuation.

Alluding to the above, the divider 203 is connected to the vending machine controller via the SMA socket 205 and each RFID antenna 107 provides the electromagnetic intensity in the near range, where the mentioned intensity results in the possibility to detect the presence or absence of the passive RFID tags 111 near each RFID antenna 107, where each passive RFID tag 111 is attached to each product.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for data transfer between a server, a remote vending machine and a user computing device, said system comprising:
   a remote vending machine for selectively providing an item stored therein to a user;
   a user computing device;
   an accounting server;
   a transaction server; and
   a data transfer network;
   wherein said vending machine comprises a door, a radio-frequency identification (RFID) antenna, a communication module, a memory, and a controller, wherein said controller is communicatively coupled by a data transfer bus with said memory, said communication module and said RFID antenna;
   wherein said RFID antenna comprises a pair of short-circuited emitters each comprising a pair of copper layers separated by a dielectric layer and each coupled to an antenna divider disposed between said pair of short-circuited emitters, wherein each short-circuited emitter is coupled to said antenna divider by a respective cable having a pair of opposite ends each comprising a low signal attenuation and feed point, and wherein said antenna divider comprises an SMA connector that connects said antenna divider to said controller of said vending machine;
   wherein said user computing device comprises an authorization module and is configured to transfer to and receive data from said accounting server;
   wherein said accounting server is connected to an operator display and configured to communicate, via said data transfer network, with said user computing device, remote vending machine and transaction server, said accounting server comprising an artificial intelligence (AI) module and configured to perform accounting and transactions for the item in said remote vending machine, and wherein said AI module of said accounting server is configured to automatically analyze inventory data of the item stored in said remote vending machine and transmit the inventory data to said operator display;
   wherein said transaction server comprises a database and configured to facilitate a transaction between said accounting server and said user computing device; and
   wherein said accounting and transaction servers, said vending machine and said user computing device are communicatively interconnected with one another by said data transfer network.

2. The system for data transfer of claim 1, wherein said accounting server is configured to perform a transaction with said transaction server in response to data received from said remote vending machine after said door of said remote vending machine is closed.

3. The system for data transfer of claim 1, wherein the inventory data includes a forecast of future inventories of the item in said remote vending machine based on information received from said remote vending machine and an expiration date of the item in said remote vending machine.

4. The system for data transfer of claim 1, wherein said accounting server is configured, in response to data received from said remote vending machine, to transmit the data to said transaction server, and wherein said transaction server is configured to perform the transaction between said accounting server and said user computing device based on the data.

5. The system for data transfer of claim 1, wherein said remote vending machine is configured to communicate, via said communication module and data transfer network, with said accounting server and user computing device.

6. The system for data transfer of claim 1, wherein said authorization module is configured to provide an authorization or authentication of a user, wherein if the authorization fails said authorization module is configured to prompt a display of said user computing device to display an error, and if the authorization succeeds said authorization module is configured to:
   transmit a command to said controller of said remote vending machine to initiate said controller to open or unlock said door of said remote vending machine;
   receive data from said controller of said remote vending machine after said door of said remote vending machine closes or locks; and
   prompt a transaction to be made between said accounting server and transaction server based on the data from said controller of said remote vending machine.

7. The system for data transfer of claim 6, wherein said authorization module is configured to initiate the display of said user computing device to display information about the item and a price of the item.

8. The system for data transfer of claim 1, wherein said remote vending machine further comprises a temperature gauge and a humidity gauge, wherein said controller of said vending machine is configured to receive data transmitted by said RFID antenna and said temperature and humidity gauges of said remote vending machine, and wherein said controller is configured to register the data and, in response to a deviation from humidity or temperature set limit, said controller is configured to prompt a respective humidity or temperature adjustment unit of said remote vending machine to regulate respective humidity or temperature inside a chamber of said remote vending machine.

9. The system for data transfer of claim 8, wherein said remote vending machine further comprises an interface display configured to provide video content, and wherein said interface display is controlled by said controller of said remote vending machine.

10. The system for data transfer of claim 1, wherein the item includes a passive RFID tag attached thereto, wherein said RFID antenna is configured to detect presence or absence of the passive RFID tag of the item inside said remote vending machine, and wherein said RFID antenna is configured to communicate information on whether the passive RFID tag is present or absent to said controller, said controller is configured to transmit the information, via said communication module, to said accounting server.

11. The system of data transfer of claim 10, wherein said RFID antenna is configured to radiate an electromagnetic intensity field, wherein the passive RFID tag is configured, in response to the electromagnetic intensity field, to modulate a high-frequency field, wherein the RFID antenna is configured, in response to the high-frequency field, to switch to a reading mode to receive and transmit vibrations of the high-frequency field of the passive RFID tag to said controller.

12. The system of data transfer of claim 11, wherein the vibrations transmitted by said RFID antenna to said controller are received after said door of said remote vending machine is locked or closed.

13. The system of data transfer of claim 12, wherein said controller of said remote vending machine is configured, in response to said door of said remote vending machine locking or closing, to prompt said RFID antenna to receive the information on whether the passive RFID tag is present or absent, and wherein said RFID antenna is configured, in response to the passive RFID tag being absent, to transmit data related to the passive RFID tag being absent to said controller.

14. The system of data transfer of claim 13, wherein said controller is configured, in response to receiving the data related to the passive RFID tag being absent, to perform a comparison of the data with data stored in said memory of said remote vending machine.

15. The system for data transfer of claim 14, wherein the comparison includes a determination that the data was or was not detected and transmitted to said accounting server when said door was last opened or unlocked, and wherein said controller is configured, in response to the determination that the data was not detected and transmitted, to store the data in said memory for subsequent comparisons and transmit the data to said accounting server.

16. The system for data transfer of claim 15, wherein said accounting server is configured to store the data in a database that contains information related to inventory of said remote vending machine, and wherein said AI module performs an automatic analysis of the information and transmits the analysis to said operator display.

17. The system for data transfer of claim 16, wherein said accounting server is configured to communicate with said transaction server and transmit a request for a transaction based on the data related to the passive RFID tag being absent, and wherein said transaction server is configured to receive the request and process the transaction between said user computing device and accounting server.

18. A system for data transfer between a server, a remote vending machine and a user computing device, said system comprising:
- a remote vending machine for selectively providing an item stored therein to a user;
- a user computing device;
- an accounting server;
- a transaction server; and
- a data transfer network;
- wherein said vending machine comprises a door, a radio-frequency identification (RFID) antenna, a communication module, a memory, an interface display, and a controller, wherein said controller is communicatively coupled by a data transfer bus with said memory, said communication module and said RFID antenna, and wherein said interface display is controlled by said controller of said remote vending machine;
- wherein said RFID antenna comprises a pair of short-circuited emitters each comprising a pair of copper layers separated by a dielectric layer, an antenna divider disposed between said pair of short-circuited emitters, a pair of cables each having a pair of opposite ends with each end comprising a low signal attenuation and feed point, and an SMA connector coupled to said antenna divider and said controller of said vending machine, and wherein each cable connects respective one of said pair of short-circuited emitters to said antenna divider;
- wherein said user computing device comprises an authorization module, said user computing device is configured to transfer to and receive data from said accounting server;
- wherein said accounting server is connected to an operator display and configured to communicate, via said data transfer network, with said user computing device, remote vending machine and transaction server, said accounting server comprising an artificial intelligence (AI) module and configured to perform accounting and transactions for the item in said remote vending machine, wherein said accounting server is configured to perform a transaction with said transaction server in response to data received from said remote vending machine after said door of said remote vending machine is closed, and wherein said AI module of said accounting server is configured to automatically analyze inventory data of the item stored in said remote vending machine and transmit the inventory data to said operator display;
- wherein said transaction server comprises a database and configured to facilitate a transaction between said accounting server and said user computing device; and
- wherein said accounting and transaction servers, said vending machine and said user computing device are communicatively interconnected with one another by said data transfer network.

19. The system for data transfer of claim 18, wherein said authorization module is configured to provide an authorization or authentication of a user, wherein if the authorization fails said authorization module is configured to prompt a display of said user computing device to display an error, and if the authorization succeeds said authorization module is configured to:
- transmit a command to said controller of said remote vending machine to initiate said controller to open or unlock said door of said remote vending machine;
- receive data from said controller of said remote vending machine after said door of said remote vending machine closes or locks; and
- prompt a transaction to be made between said accounting server and transaction server based on the data from said controller of said remote vending machine.

20. The system for data transfer of claim 18, wherein the item includes a passive RFID tag attached thereto, wherein said RFID antenna is configured to radiate an electromagnetic intensity field, wherein the passive RFID tag is configured, in response to the electromagnetic intensity field, to modulate a high-frequency field, wherein the RFID antenna is configured, in response to the high-frequency field, to switch to a reading mode to receive and transmit vibrations of the high-frequency field of the passive RFID tag to said controller, wherein said RFID antenna is configured to detect presence or absence of the passive RFID tag of the item inside said remote vending machine, and wherein said RFID antenna is configured to communicate information on whether the passive RFID tag is present or absent to said controller, said controller is configured to transmit the information, via said communication module, to said accounting server.

\* \* \* \* \*